United States Patent Office 2,967,895
Patented Jan. 10, 1961

2,967,895
PROCESS FOR THE PRODUCTION OF 1,2,4-TRIVINYLCYCLOHEXANE

Fritz Derichs, Walter Franke, and Walter Stumpf, all of Marl, Kreis Recklinghausen, Germany, assignors to Chemische Werke Huls Aktiengesellschaft, Marl, Kreis Recklinghausen, Germany, a corporation of Germany No Drawing. Filed June 25, 1959, Ser. No. 822,719

Claims priority, application Germany July 1, 1958

2 Claims. (Cl. 260—666)

We have found that 1,2,4-trivinylcyclohexane can be obtained with advantage if cyclododecatriene (1,5,9) is conducted in the vapor phase over palladium catalysts at temperatures between 400 and 600° C.

Cyclododecatriene (1,5,9) is easily obtained by the polymerization of butadiene (see Belgian Patent No. 555,180). It can be diluted during the reaction with from 0.1 to 2 parts, preferably from 0.1 to 0.5 part of an inert gas, such as nitrogen, carbon dioxide, etc. per 1 part of the cyclododecatriene (1,5,9) formed. As palladium catalysts are particularly suitable those which contain 0.1 to 20%, preferably 2 to 10% of metallic palladium on an inert carrier material such as activated carbon.

The catalysts are produced, for example, in known manner by impregnating the carrier material with a solution of palladium hydrochloride and reduction at temperatures of 200 to 500° C. in a stream of hydrogen.

At temperatures below 400° C. there is substantially no isomerization while at temperatures above 600° C. annoying side reactions predominate. In the range between 400 and 600° C. preferably between 450 and 550° C., the isomerization takes place practically without any dehydration in satisfactory yields. The reaction is carried out under atmospheric or increased or reduced pressure. In general, undiluted cyclododecatriene (1,5,9) is used preferably at reduced pressure, while normal or a slightly increased pressure is applied when the cyclododecatriene (1,5,9) is diluted with inert gases. The stay period of the isomerization mixture in contact with the catalyst may vary between 0.1 and 100, preferably between 5 and 20 seconds. The working up of the reaction product is effected preferably by distillation under reduced pressure.

The 1,2,4-trivinylcyclohexane, obtained in a yield of more than 85% of the theory is a valuable intermediate for the production of high melting insoluble polymerization products.

Example 1

Into a vertical tube of 50 cm. length and a diameter of 1.7 cm., charged with 50 cc. of a 10% palladium catalyst on activated carbon, are introduced in the course of 7 hours, 227 g. (1.4 moles) of cyclododecatriene (1,5,9) at 450° C. At the same time nitrogen is introduced at such a rate (about 1 liter/hour) that the stay period of cyclododecatriene (1,5,9) in contact with the catalyst is about 15 sec.

After the condensation we obtain 223 g. of an isomerization mixture from which 35 g. of 1,2,4-trivinylcyclohexane, B.P.$_{20}$:89° C., $n_D^{20}$:1.4801, are obtained by fine distillation in vacuum. The yield of 1,2,4-trivinylcyclohexane is 61.5% with a conversion of 26%.

Example 2

Under the conditions of Example 1, but at a temperature of 475° C., 227 g. cyclododecatriene (1,5,9) are isomerized in the course of 8 hours with a stay period of 15 seconds. We obtain 222 g. of an isomerization mixture from which 65 g. of 1,2,4-trivinylcyclohexane, B.P.$_{10}$:80.5° C., $n_D^{20}$:1.4792, are obtained by fractional distillation. The yield is 71% with a conversion of 41.5%.

Example 3

If the isomerization is carried out under otherwise the same conditions as in Example 1 but at 500° C. and a mean stay period of 15 seconds, we obtain from 227 g. (1.4 moles) of cyclododecatriene (1,5,9), 145 g. of 1,2,4-trivinylcyclohexane B.P.$_{20}$:89.5° C., $n_D^{20}$:1.4806. The yield is then 76% with a conversion of 88%.

Example 4

Under the conditions of Example 1, but at a temperature of 480° C. and a mean stay period of 45 seconds, 70 g. (0.43 moles) cyclododecatriene (1,5,9), are isomerized. We obtain by condensation 68 g. of a mixture which contains 80% of 1,2,4-trivinylcyclohexane according to the infrared spectral analysis.

Example 5

243 g. (1.5 moles) cyclododecatriene (1,5,9) are isomerized under the conditions of Example 1 at 500° C. and a mean stay period of 5 seconds. We obtain 242 g. of a mixture which the infrared spectral analysis shows to be 50% 1,2,4-trivinylcyclohexane.

Example 6

The isomerization is effected with a 10% palladium catalyst on activated carbon in the apparatus described in Example 1, at 500° C. and a pressure of 50 Torr 198 g. (1.22 moles) of cyclododecatriene (1,5,9) are put through with a mean stay period of 0.5 second. We obtain 195 g. of an isomerization mixture which contains 40% of 1,2,4-trivinylcyclohexane according to the infrared spectral analysis.

Example 7

The isomerization is effected under the same conditions as in Example 6, but at a pressure of 200 Torr. We obtain with a mean stay period of 2 seconds from 198 g. of cyclododecatriene (1,5,9), 193 g. of an isomerization mixture that contains 80% 1,2,4-trivinylcyclohexane according to the infrared spectral analysis.

We claim:
1. Process for the production of 1,2,4-trivinylcyclohexane from cyclododecatriene (1,5,9) which comprises passing cyclododecatriene (1,5,9) in the vapor phase over a palladium catalyst at a temperature of from 400 to 600° C.
2. 1,2,4-trivinylcyclohexane.

References Cited in the file of this patent
UNITED STATES PATENTS
2,686,208  Reed _____ Aug. 10, 1954